(12) United States Patent
Yang et al.

(10) Patent No.: US 10,859,893 B2
(45) Date of Patent: *Dec. 8, 2020

(54) LENS LIMITING ASSEMBLY, CAMERA BODY AND CAMERA

(71) Applicants: SZ DJI TECHNOLOGY CO., LTD., Shenzhen (CN); JCD (Guangzhou) Optical Corporation Limited, Guangzhou (CN)

(72) Inventors: Feihu Yang, Shenzhen (CN); Jianguo Zhu, Shenzhen (CN); Yanxin Huang, Shenzhen (CN)

(73) Assignees: SZ DJI TECHNOLOGY CO., LTD., Shenzhen (CN); JCD (GUANGZHOU) OPTICAL CORPORATION LIMITED, Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,055

(22) Filed: Sep. 18, 2019

(65) Prior Publication Data

US 2020/0012176 A1    Jan. 9, 2020

Related U.S. Application Data

(63) Continuation of application No. 16/121,117, filed on Sep. 4, 2018, now Pat. No. 10,437,135, which is a continuation of application No. 15/497,368, filed on Apr. 26, 2017, now Pat. No. 10,073,325, which is a continuation of application No. PCT/CN2015/079521, filed on May 21, 2015.

(30) Foreign Application Priority Data

Oct. 27, 2014   (WO) ................ PCT/CN2014/089604

(51) Int. Cl.
*G03B 17/14*       (2006.01)
*F16M 13/02*       (2006.01)

(52) U.S. Cl.
CPC ............. *G03B 17/14* (2013.01); *F16M 13/02* (2013.01)

(58) Field of Classification Search
None
See application file for complete search history.

(56) References Cited

U.S. PATENT DOCUMENTS

| 3,559,542 A | 2/1971 | Clapp et al. |
| 3,782,260 A | 1/1974 | Ettischer et al. |
| 4,466,019 A | 8/1984 | Sakashita et al. |

(Continued)

FOREIGN PATENT DOCUMENTS

| CN | 1484058 A | 3/2004 |
| CN | 201104277 Y | 8/2008 |

(Continued)

OTHER PUBLICATIONS

The European Patent Office (EPO) The Extended European Search Report for 15853756.3 dated Jul. 31, 2017 7 Pages.

(Continued)

*Primary Examiner* — William B Perkey
(74) *Attorney, Agent, or Firm* — Anova Law Group, PLLC

(57) ABSTRACT

A lens limiting assembly includes an elastic element including an annular elastic body and an elastic arm extending from an inner side of the elastic body inward and downward along an axial direction, and a locking ring including a flange configured to abut against the elastic arm.

20 Claims, 20 Drawing Sheets

(56) References Cited

U.S. PATENT DOCUMENTS

| | | | |
|---|---|---|---|
| 4,659,203 A | 4/1987 | Niwa et al. | |
| 10,073,325 B2* | 9/2018 | Yang | G03B 17/14 |
| 10,437,135 B2* | 10/2019 | Yang | F16M 13/02 |
| 2004/0141232 A1 | 7/2004 | Luthardt et al. | |
| 2006/0165401 A1 | 7/2006 | Doi et al. | |
| 2008/0075454 A1 | 3/2008 | Iikawa et al. | |
| 2013/0100344 A1 | 4/2013 | Kikuchi et al. | |
| 2015/0212395 A1 | 7/2015 | Kuroda et al. | |
| 2016/0041453 A1 | 2/2016 | Pizzo et al. | |
| 2016/0230796 A1 | 8/2016 | Chiang et al. | |
| 2017/0219916 A1 | 8/2017 | Tang et al. | |
| 2017/0227833 A1 | 8/2017 | Yang et al. | |

FOREIGN PATENT DOCUMENTS

| | | |
|---|---|---|
| CN | 103064234 A | 4/2013 |
| CN | 103365043 A | 10/2013 |
| CN | 203250100 U | 10/2013 |
| CN | 103608725 A | 2/2014 |
| CN | 204178095 U | 2/2015 |
| CN | 103365043 B | 4/2016 |
| GB | 2241068 A | 8/1991 |
| JP | 2004133358 A | 4/2004 |
| JP | 2007298671 A | 11/2007 |
| JP | 2010072456 A | 4/2010 |
| JP | 2014157248 A | 8/2014 |

OTHER PUBLICATIONS

The World Intellectual Property Organization (WIPO) International Search Report for PCT/CN2014/089604 dated Jul. 22, 2015 6 Pages.

The World Intellectual Property Organization (WIPO) International Search Report for PCT/CN2015/079521 dated Jul. 1, 2015 7 Pages.

* cited by examiner

US 10,859,893 B2

LENS LIMITING ASSEMBLY, CAMERA BODY AND CAMERA

CROSS-REFERENCE TO RELATED APPLICATIONS

This application is a continuation of application Ser. No. 16/121,117, filed on Sep. 4, 2018, which is a continuation of application Ser. No. 15/497,368, filed on Apr. 26, 2017, now U.S. Pat. No. 10,073,325, which is a continuation application of International Application No. PCT/CN2015/079521, filed on May 21, 2015, which claims the benefit of priority to International Application No. PCT/CN2014/089604, filed on Oct. 27, 2014, the entire contents of all of which are incorporated herein by reference.

TECHNICAL FIELD

The present disclosure relates to a lens limiting assembly, a camera body comprising the lens limiting assembly, and a camera comprising the camera body.

BACKGROUND ART

A camera includes a lens and a body in a fixed or detachable connection. To ensure the stabilization of imaging, it is desired to keep the flange focal distance, i.e., the distance from the lens to an image sensor, as precise as possible, so that the image can be stable and clear. In existing technologies, the lens is rotatably mounted to the body of the camera and hooked by a lens assembly ring on the body. A lens release button assembly is arranged at the lens assembly ring and inserted into the lens to prevent the lens from falling off.

With the existing technologies, since the lens can rotate, a gap of about 0.05 mm usually exists between the lens and the body. Thus, if the camera is used on a vibrating platform, it may lead to a poor contact, or even a failure, between the contact at the back and the camera lens. In addition, the flange focal distance of the lens may also change due to the gap. To avoid the gap, a strip spring may be used, but the strip spring piece is not stable enough to guarantee a close fit.

SUMMARY

In one aspect, embodiments of the present disclosure provide a camera body comprising a fixing frame having a contact base mounting position and a lens limiting assembly arranged at the contact base mounting position. The lens limiting assembly comprises an elastic element arranged on the contact base mounting position, a lens assembly ring arranged on the elastic element, and a locking ring configured to abut against and press the elastic element when the locking ring rotates in one direction.

In another aspect, embodiments of the present disclosure provide a camera comprising a lens including a snapping body provided on an outer side of the lens and a camera body. The camera body comprises a fixing frame having a contact base mounting position and a lens limiting assembly arranged on the contact base mounting position. The lens limiting assembly comprises an elastic element arranged on the contact base mounting position, a lens assembly ring arranged on the elastic element, and a locking ring configured to abut against and press the elastic element when the locking ring rotates in one direction. The snapping body is configured to be snapped below the elastic element when the lens is assembled in the lens assembly ring, and the elastic element presses the snapping body to lock the lens.

DESCRIPTION OF REFERENCE NUMERALS FOR MAIN ELEMENTS

TABLE 1

| | |
|---|---|
| Camera | 300 |
| Lens | 310 |
| Lens barrel | 312 |
| Assembly part | 313 |
| Snapping body | 314 |
| Camera body | 200 |
| Fixing frame | 210 |
| Contact | 215 |
| First assembly hole | 216 |
| Second assembly hole | 217 |
| Mounting column | 2171 |
| Stepped surface | 2173 |
| Via hole | 2174 |
| Contact base mounting position | 220 |
| Locating pin | 230 |
| Bolt | 240 |

TABLE 1-continued

| | |
|---|---|
| Limiting structure | 250 |
| Press key | 251 |
| Key body | 2511 |
| First surface | 2512 |
| Second surface | 2513 |
| Snapping space | 2514 |
| Snapping part | 2515 |
| First snapping arm | 2516 |
| First inclined surface | 2517 |
| Surface | 2518 |
| Second snapping arm | 2519 |
| Limiting boss | 253 |
| Post | 2531 |
| Bracket | 2533 |
| Shaft | 2535 |
| First supporting part | 2536 |
| Second supporting part | 2537 |
| Limiting end | 2538 |
| Upper boss | 2538a |
| Lower boss | 2538b |
| Second inclined surface | 2538c |
| Support end | 2539 |
| First elastic member | 255 |
| Second elastic member | 257 |
| Lens limiting assembly | 100 |
| Elastic element | 10 |
| Elastic body | 11 |
| Elastic arm | 12 |
| First end | 121 |
| Second end | 123 |
| First locating hole | 14 |
| Snapping opening | 16 |
| Lens assembly ring | 20 |
| First end face | 21 |
| Second locating hole | 211 |
| Receiving groove | 213 |
| Second end face | 23 |
| Assembly hole | 231 |
| Bolt hole | 233 |
| Limiting part | 25 |
| Mounting part | 27 |
| Locking ring | 30 |
| Body | 31 |
| Hook | 33 |
| Connecting part | 331 |
| Bent part | 333 |
| Flange | 335 |
| Anti-slip part | 35 |
| Lens limiting assembly | 500 |
| Elastic element | 510 |
| First locating hole | 514 |
| Second locating hole | 528 |
| Fitting hole | 529 |
| Bolt hole | 291 |
| Snapping opening | 516 |
| Lens assembly ring | 520 |
| Locking ring | 530 |
| Elastic arm | 512 |
| Limiting part | 522 |
| Receiving groove | 527 |
| First fitting face | 524 |
| Smooth surface | 526 |
| Hook | 532 |
| Connecting part | 5321 |
| Bent part | 5322 |
| Second fitting face | 534 |
| Planar surface | 536 |
| Anti-slip groove | 538 |
| Camera body | 600 |
| Fixing frame | 610 |
| Contact base mounting position | 612 |
| Contact | 620 |
| Lens | 700 |
| Lens barrel | 712 |
| Assembly part | 713 |
| Snapping body | 714 |
| Locating pin | 721 |
| Bolt | 722 |
| Telescopic limiting structure | 650 |
| Circular nut | 651 |

TABLE 1-continued

| | |
|---|---|
| Post | 652 |
| Camera | 800 |

DESCRIPTION OF THE EMBODIMENTS

Embodiments of the present disclosure will be described with reference to the accompanying drawings. The described embodiments are only some rather than all of the embodiments of the present disclosure. All other embodiments obtained by a person of ordinary skill in the art based on the embodiments described here without creative efforts shall fall within the scope of the present disclosure.

Figure 1:
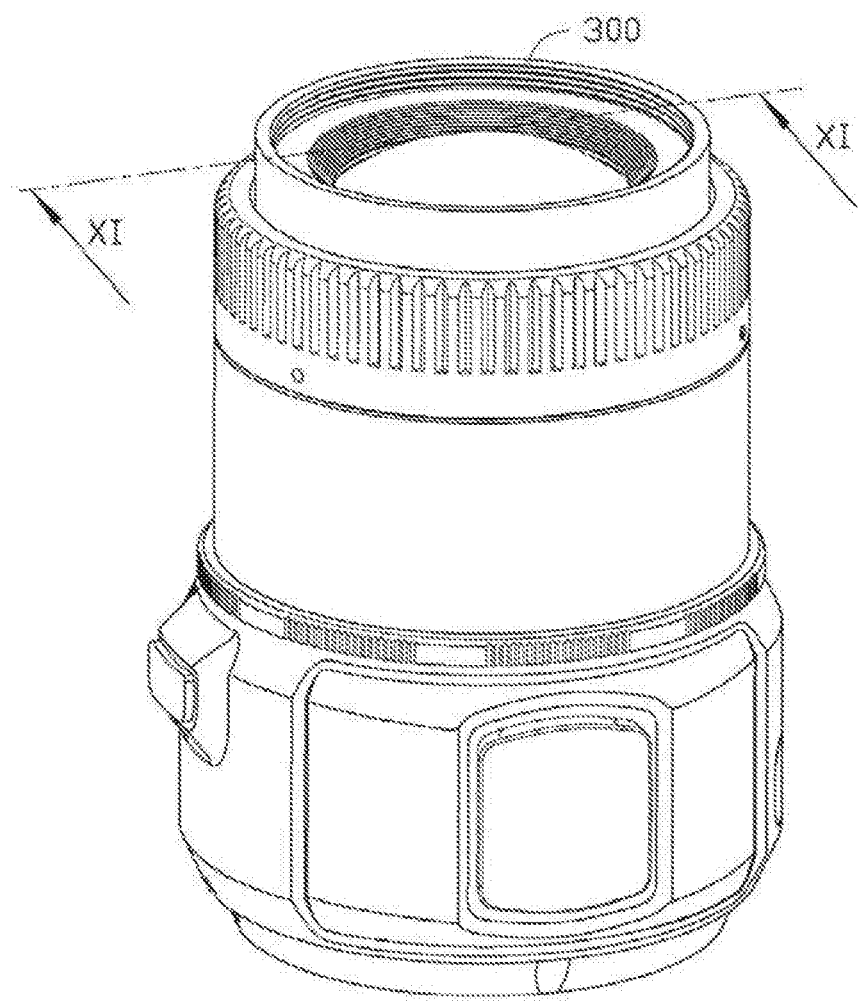
FIG. 1 is an assembled schematic diagram of a camera according to an exemplary embodiment.
Figure 2:
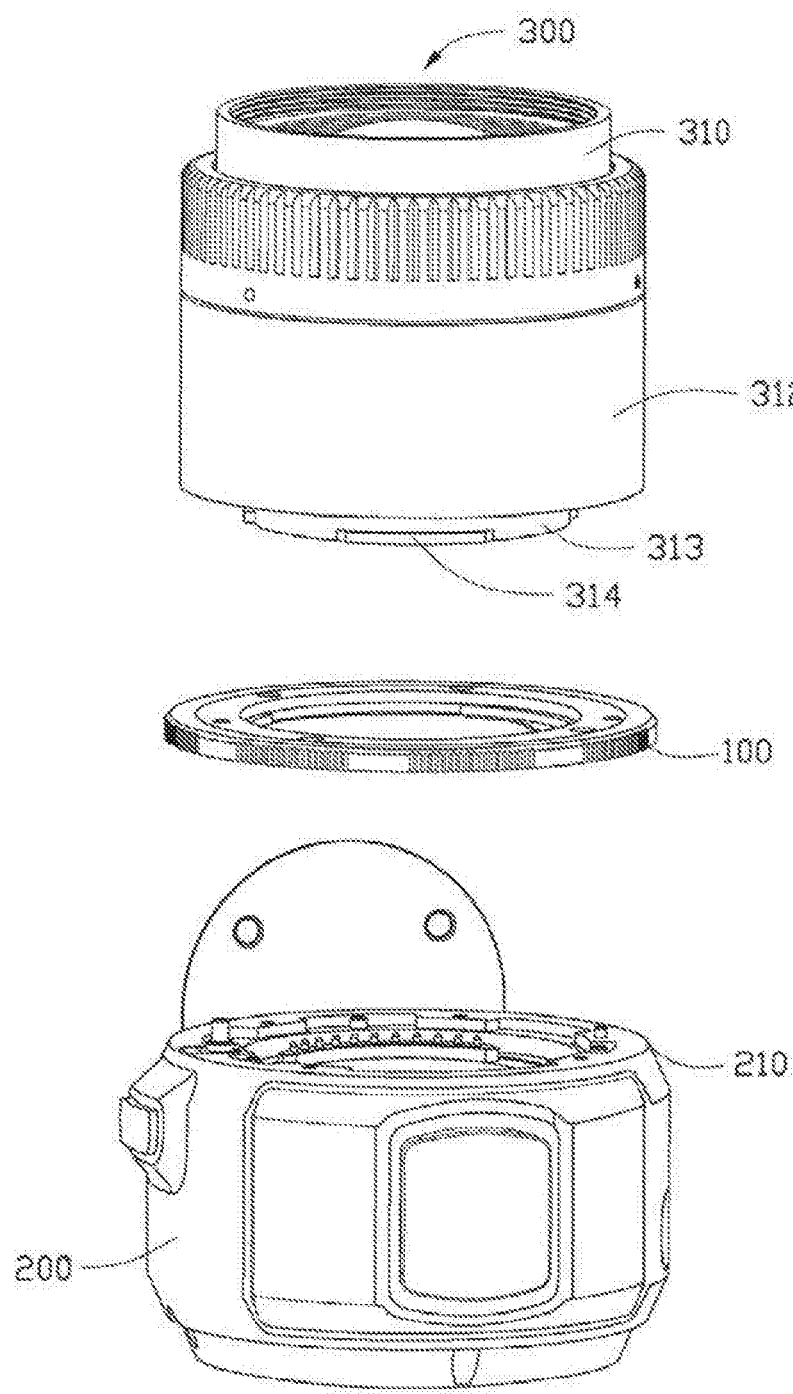
FIG. 2 is an exploded schematic view of the camera shown in FIG. 1.

FIG. 1 shows an exemplary camera 300 consistent with embodiments of the disclosure. The camera 300 may be an ordinary camera with a detachable lens, a single-lens reflex camera, or a special-purpose camera, e.g., an aerial camera for using on an unmanned aerial vehicle. FIG. 2 shows the camera 300 in a disassembled state. As shown in FIG. 2, the camera 300 comprises a lens 310 and a camera body 200. The camera body 200 comprises a lens limiting assembly 100, and the lens 310 can be mounted to the camera body 200 through the lens limiting assembly 100.

The lens 310 comprises a lens barrel 312. An assembly part 313 is arranged at a bottom end of the lens barrel 312. Three snapping bodies 314 spaced apart from each other are arranged on an outer wall of the assembly part 313 and are used to cooperate with the lens limiting assembly 100.

Figure 3:
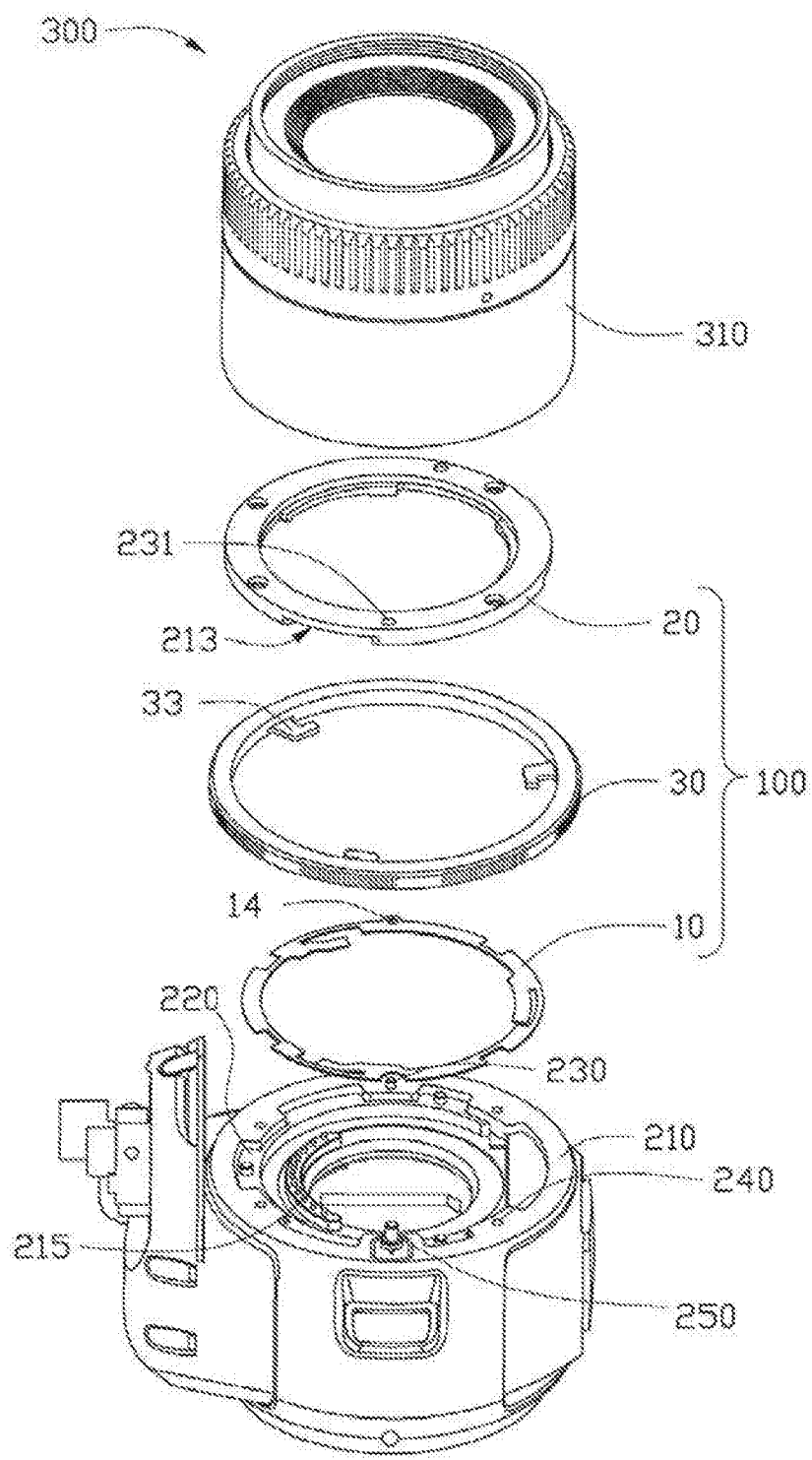
FIG. 3 is an exploded schematic view of the camera shown in FIG. 2.

FIG. 3 is a partially exploded view of the camera 300. As shown in FIG. 3, the camera body 200 comprises a fixing frame 210, and the lens limiting assembly 100 is arranged in the fixing frame 210. Contacts 215 are arranged in the fixing frame 210 and are configured to be electrically coupled to, e.g., a driver in the lens 310 when the lens 310 is fastened and assembled on the camera body 200.

A plurality of contact base mounting positions 220 for assembling the lens 310 are provided on the fixing frame 210. The fixing frame 210 further includes a locating pin 230, four bolts 240 and a telescopic limiting structure 250.

In some embodiments, the number of the locating pins 230, the number of the bolts 240, and the number of the snapping bodies 314 are not limited to the above numbers, and can be chosen according to actual needs.

Figure 4:
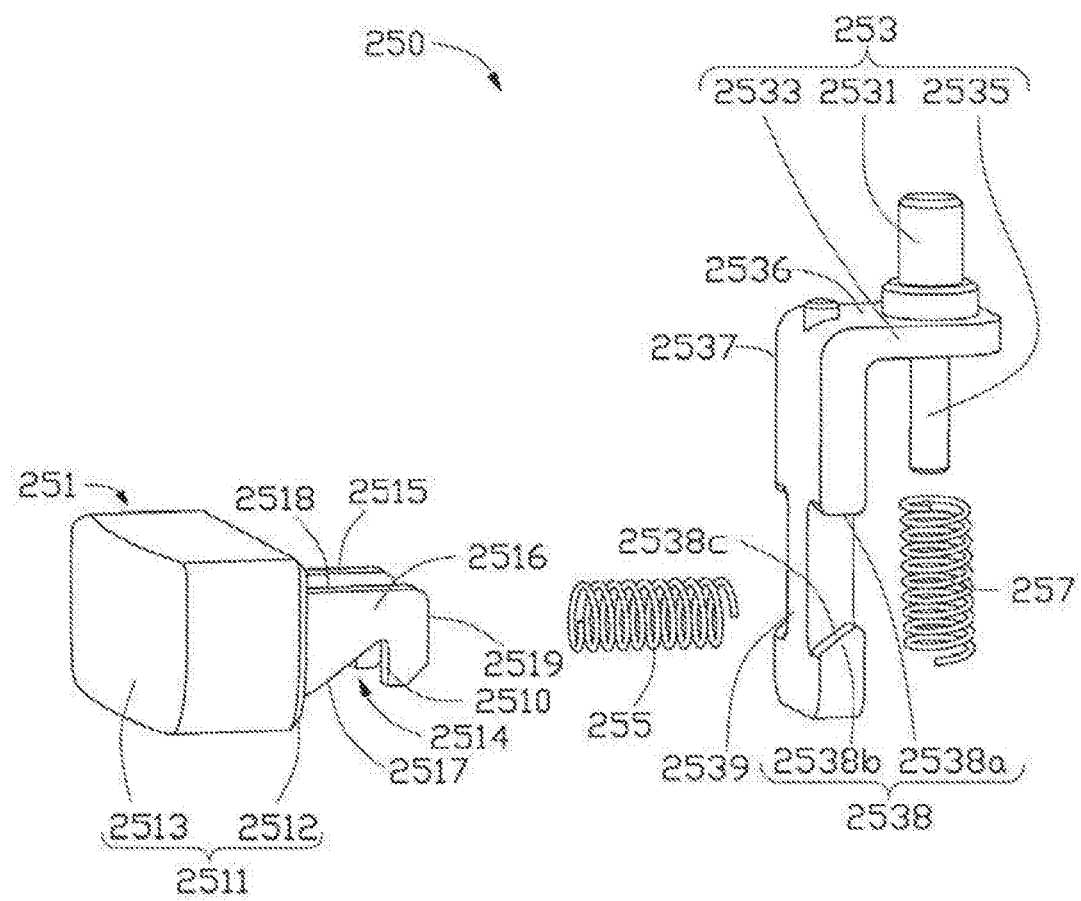
FIG. 4 is an exploded schematic view of a limiting structure shown in FIG. 3.

FIG. 4 is an exploded view of the limiting structure 250. As shown in FIG. 4, the limiting structure 250 comprises a press key 251, a limiting boss 253, a first elastic member 255, and a second elastic member 257. The press key 251 is connected to the limiting boss 253. The first elastic member 255 is arranged between the press key 251 and the limiting boss 253. The second elastic member 257 is sheathed on the limiting boss 253.

The press key 251 is movably arranged on a side surface of the camera body 200, making it easy for a user to press. The press key 251 comprises a key body 2511 and two snapping parts 2515 arranged on the key body 2511. The key body 2511 includes a substantially cuboid structure comprising a first surface 2512 and a second surface 2513 arranged oppositely. The first surface 2512 is closer to the limiting boss 253, while the second surface 2513 is farther away from the limiting boss 253. The two snapping parts 2515 extend in a direction perpendicular to the first surface 2512 from two locations close to two ends of the first surface 2512, respectively, and are arranged spaced apart from each other. The user can press the second surface 2513 to control the press key 251. Each snapping part 2515 comprises a first snapping arm 2516 and a second snapping arm 2519 which are formed integrally. A first inclined surface 2517 is formed at one side of the first snapping arm 2516. In some embodiments, the first inclined surface 2517 inclines from the first surface 2512 of the key body 2511 in the direction away from the first surface 2512, i.e., the width of the first snapping arm 2516 in a direction parallel to the first surface 2512 decreases gradually from the first surface 2512 in the direction away from the first surface 2512. The first snapping arm 2516 further comprises a surface 2518 opposite to the first inclined surface 2517. In some embodiments, the surface 2518 includes a planar surface. The second snapping arm 2519 is arranged at the end of the first snapping arm 2516 opposite to the first surface 2512, and is arranged substantially parallel to the first surface 2512. The second snapping arm 2519 comprises a clamping edge 2510. The clamping edge 2510 extends from the side of the first inclined surface 2517 opposite to the first surface 2512 in a direction parallel to the first surface 2512. A snapping space 2514 is formed between the clamping edge 2510 and the first inclined surface 2517. The snapping space 2514 can be used to snap the limiting boss 253.

The number of the snapping parts 2515 is not limited to the above-described number, and can be chosen according to actual needs.

The limiting boss 253 can be movably arranged in the camera body 200, and can be used to relatively limit the position of the lens 310. The limiting boss 253 comprises a post 2531, a bracket 2533, and a shaft 2535. The post 2531 and the shaft 2535 are arranged at two opposite sides of the bracket 2533. The bracket 2533 includes an approximately inverted L-shaped structure, and comprises a first supporting part 2536 and a second supporting part 2537, which are arranged approximately perpendicular to each other. The post 2531 is vertically arranged on one side of the first supporting part 2536. The shaft 2535 is vertically arranged on the other side of the first supporting part 2536 opposite to the post 2531 and is arranged along a same straight line as the post 2531. The second supporting part 2537 is arranged parallel to the key body 2511 of the press key 251. A lower part of the second supporting part 2537 includes two limiting ends 2538 at two sides of the supporting part 2537 and a support end 2539 between the two limiting ends 2538. The support end 2539 is thinner than an upper part of the second supporting part 2537. The limiting ends 2538 and the support end 2539 can be formed by cutting inwardly from both sides of a middle lower position of the second supporting part 2537 to remove portions of the second supporting part 2537. Each of the limiting ends 2538 comprises an upper boss 2538a, a lower boss 2538b, and a second inclined surface 2538c formed on the lower boss 2538b. The upper boss 2538a and the lower boss 2538b protrude relative to the support end 2539. The second inclined surface 2538c has an inclination matching the inclination of the first inclined surface 2517.

Figure 5:
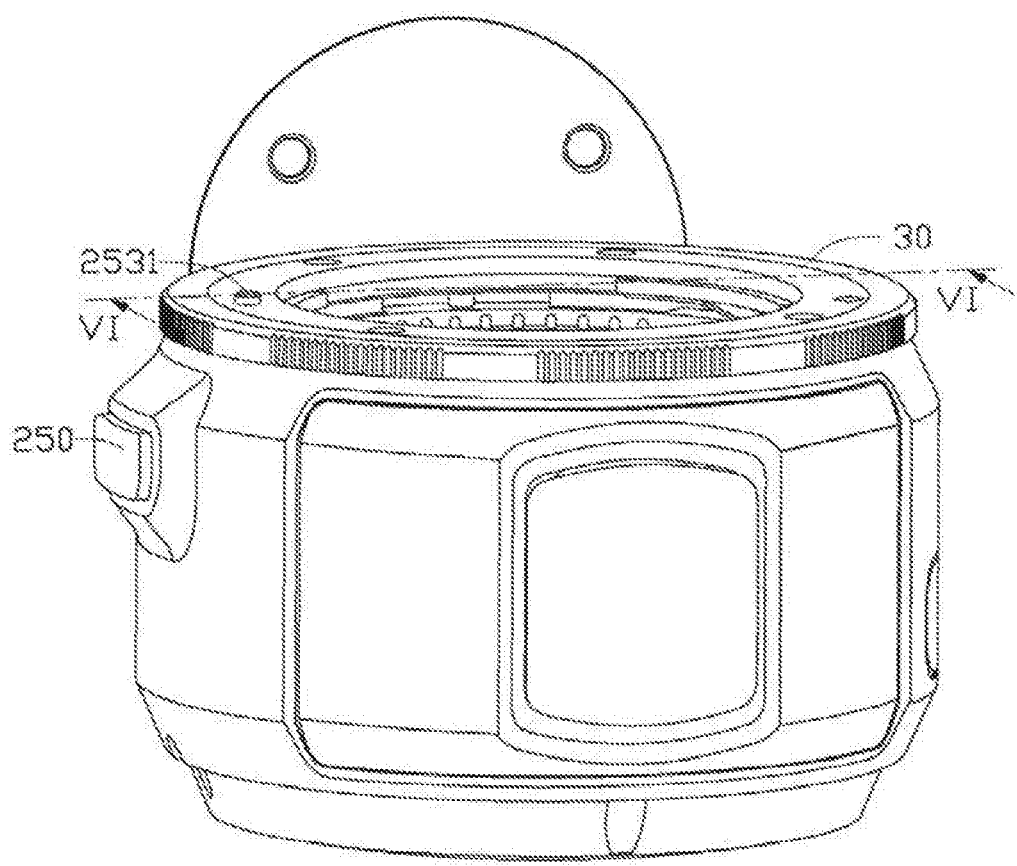
FIG. 5 is a partially assembled schematic diagram of the limiting structure shown in FIG. 4 assembled on the camera.
Figure 6:
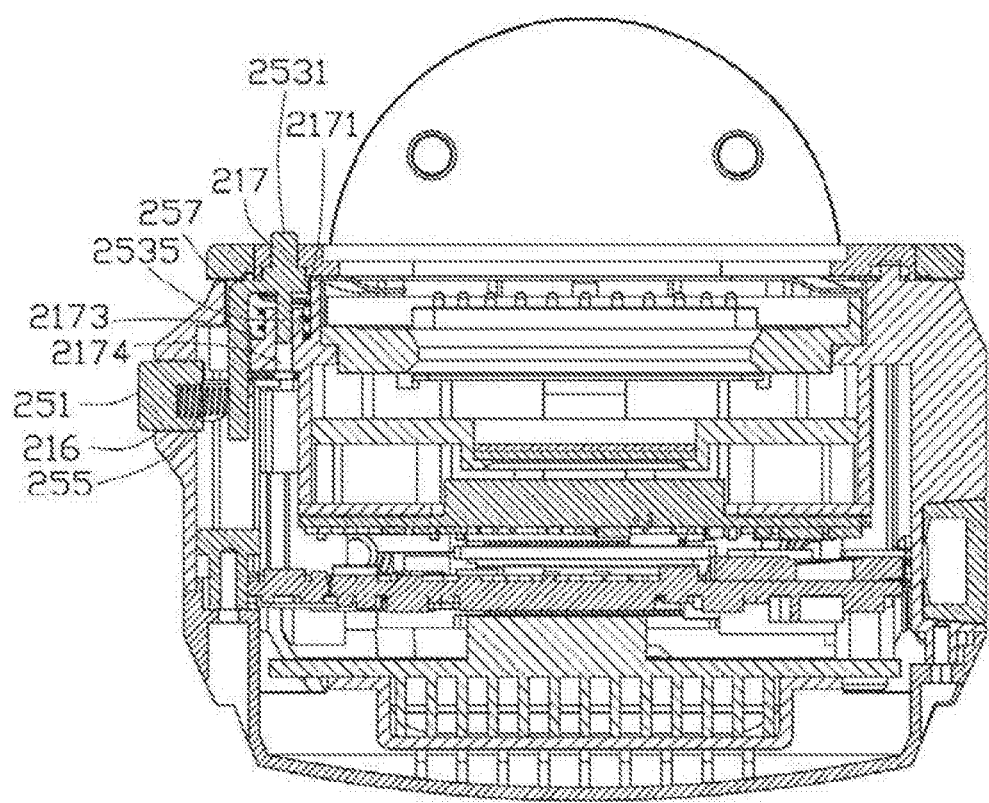
FIG. 6 is a sectional view of the camera in FIG. 5 taken along VI-VI line.

FIGS. 5 and 6 are a perspective view and a cross-sectional view, respectively, of the camera body 200. As shown in FIGS. 5 and 6, the fixing frame 210 includes a first assembly hole 216 formed in an outer wall of the fixing frame 210 from outside to inside through the outer wall. The lens limiting assembly 100 comprises a lens assembly ring 20 (see also, FIG. 3), and the lens assembly ring 20 is provided on the fixing frame 210. The lens assembly ring 20 includes a second assembly hole 217 formed through the thickness of the lens assembly ring 20. The press key 251 and the first elastic member 255 pass through the first assembly hole 216 and are received in the camera body 200. The limiting boss 253 and the second elastic member 257 pass through the second assembly hole 217 and are received in the camera body 200. The interior of the first assembly hole 216 is in communication with the interior of the second assembly hole 217, such that the press key 251, the first elastic member 255, the limiting boss 253, and the second elastic member 257 can be assembled with each other.

In some embodiments, a mounting column 2171 is formed corresponding to the second assembly hole 217. In some embodiments, the mounting column 217 is formed in the interior of the second assembly hole 217. As shown in FIG. 6, stepped surfaces 2173 are formed at two sides of the mounting column 2171, and the mounting column 2171 further includes a via hole 2174 provided in the center of the mounting column 2171. The shaft 2535 can pass through the via hole 2174 to prevent the limiting boss 253 from deviating.

When the limiting structure 250 is being assembled into the camera body 200, the support end 2539 of the limiting boss 253 is accommodated between two snapping parts 2515 of the press key 251. The first snapping arm 2516 of each of the snapping parts 2515 passes through a corresponding one of the limiting ends 2538. The first inclined surfaces 2517 of the first snapping arms 2516 respectively abut against the second inclined surfaces 2538c of the lower bosses 2538b of the limiting boss 253. The clamping edges 2510 clamp to the corresponding lower bosses 2538b, respectively. The first elastic member 255 is elastically abutted between the first surface 2512 of the key body 2511 and the support end 2539. The second elastic member 257 is sheathed on the shaft 2535, with one end of the second elastic member 257 abutting against the first supporting part 2536 and the other end abutting against the stepped surfaces 2173. When a user presses the press key 251, the second inclined surface 2538c and the first inclined surface 2517 contact each other. The acting force along the first inclined surface 2517 can be decomposed into a pushing force perpendicular to the key body 2511 and a downward pressure parallel to the key body 2511. The pushing force presses the first elastic member 255 toward the support end 2539, and the downward pressure acts on the second inclined surface 2538c and drives the limiting boss 253 to move downward so as to in turn compress the second elastic member 257 and release the limiting boss 253 from the lens 310. When the user no longer presses the press key 251, the first elastic member 255 and the second elastic member 257 recover from the deformation and drive the press key 251 and the post 2531 to rebound. In the scenario that the lens 310 is in position, the post 2531 can snap into the lens 310 to prevent the lens 310 from rotating. During the rebound of the press key 251, the clamping edge 2510 can clamp the lower boss 2538b to prevent the press key 251 from excessively rebounding and releasing from the first assembly hole 216.

The lens limiting assembly 100 is used to lock the lens 310 and prevent the lens 310 from rotating or falling off of the camera body 200 in an axial direction.

Figure 7:
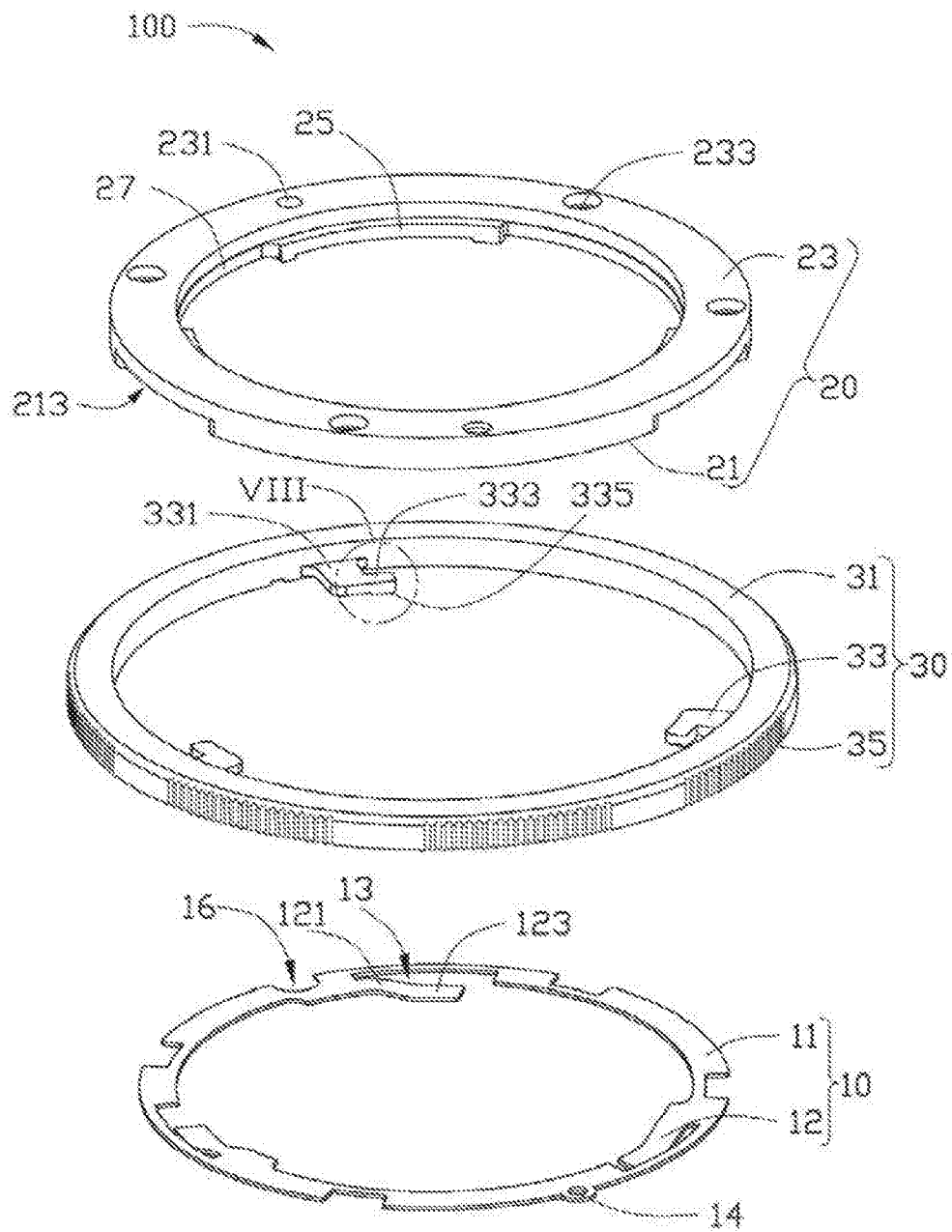
FIG. 7 is an exploded schematic view of a lens limiting assembly shown in FIG. 3.

FIG. 7 is an exploded view of the lens limiting assembly 100. As shown in FIG. 7, the lens limiting assembly 100 comprises an elastic element 10, the lens assembly ring 20, and a locking ring 30. The lens assembly ring 20 is arranged on the elastic element 10 and is accommodated in the locking ring 30, and the locking ring 30 can rotate relative to the lens assembly ring 20.

The elastic element 10 comprises an elastic body 11 and a plurality of elastic arms 12 on the elastic body 11. In some embodiments, the elastic body 11 includes an annular strip spring, and three elastic arms 12 are arranged apart from each other at an inner side of the elastic body 11. Specifically, the elastic arms 12 extend from the inner side of the elastic body 11 downwardly in the direction of the axis of the elastic body 11. Each of the elastic arm 12 comprises a first end 121 and a second end 123, with the position of the first end 121 in the direction of the axis of the elastic body 11 being higher than the position of the second end 123 in the direction of the axis of the elastic body 11, such that a gap 13 is formed between the elastic arm 12 and the elastic body 11 to accommodate a component of the locking ring 30. The elastic body 11 is further provided with a first locating hole 14 and a snapping opening 16. In some embodiments, the snapping opening 16 is formed by recessing the outer wall of the elastic body 11 inwardly. The shape of the snapping opening 16 corresponds to the shape of the limiting structure 250 of the camera body 200 so as to be nested and snapped on the limiting structure 250.

Figure 9:
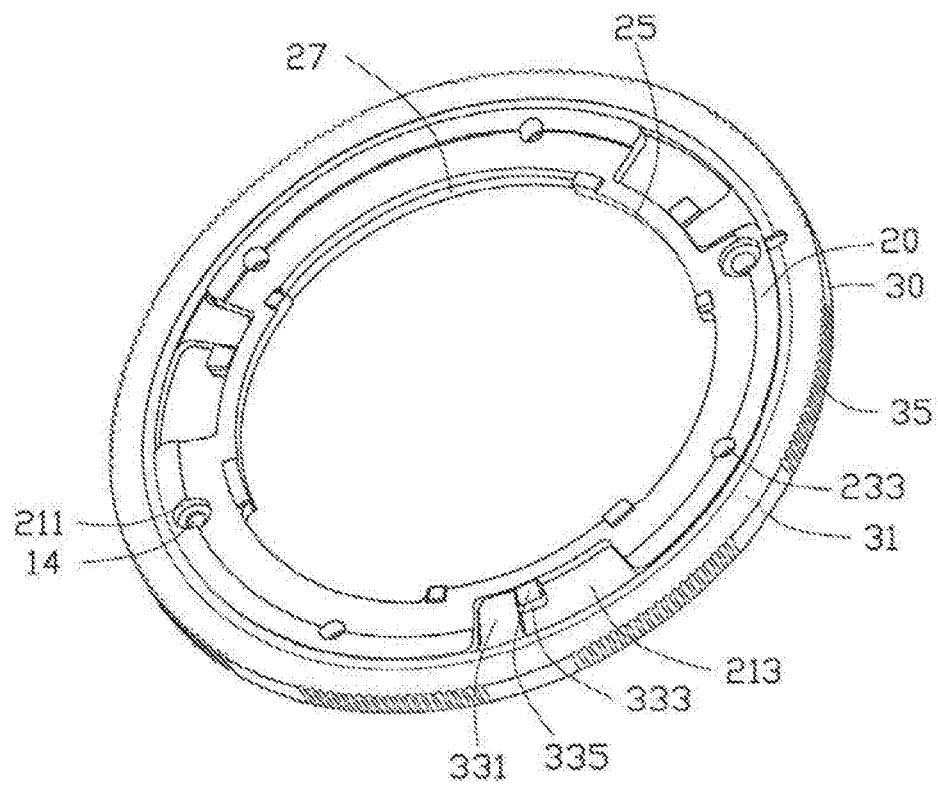
FIG. 9 is an assembled schematic diagram of a lens assembly ring shown in FIG. 4 with a locking ring.

The lens assembly ring 20 comprises a first end face 21 and a second end face 23, which are arranged oppositely. The first end face 21 is arranged to face the elastic element 10, and the second end face 23 is arranged to face away from the elastic element 10. FIG. 9 is a perspective view showing the lens assembly ring 20 and the locking ring 30 assembled together. As shown in FIG. 9, the first end face 21 is provided with a second locating hole 211. The camera body 200 further comprises a locating pin 230 that can be inserted into the first locating hole 14 and the second locating hole 211 to connect the first locating hole 14 and the second locating hole 211 in series. In some embodiments, the locating pin 230 on the camera body 200 passes through the first locating hole 14 and the second locating hole 211 to fix the elastic element 10 and the lens assembly ring 20 to the camera body 200. Three receiving grooves 213 spaced apart from each other are further provided on the first end face 21. The receiving grooves 213 can be formed by recessing the first end face 21 and is configured to receive components on the locking ring 30. The second end face 23 is provided with an assembly hole 231, which penetrates through the first end face 21 and the second end face 23. The limiting boss 253 of the camera body 200 passes through the assembly hole 231 to fix the position of the lens 310. The second end face 23 is further provided with four bolt holes 233. The camera body 200 further comprises four bolts 240 that can pass through the four bolt holes 233 to fix the lens assembly ring 20 to the camera body 200.

The inner wall of the lens assembly ring 20 includes a smooth surface, and is provided with three limiting parts 25 protruding towards the inner side and spaced apart from each other. A mounting part 27 is formed between every two of the limiting parts 25 such that the snapping bodies 314 of the lens 310 can pass through the mounting parts 27 and be mounted in the camera body 200.

The number of the elastic arms 12, the number of the receiving grooves 213, and the number of the limiting parts 25 are not limited to the above-described numbers, and can be chosen according to actual needs.

Figure 8:
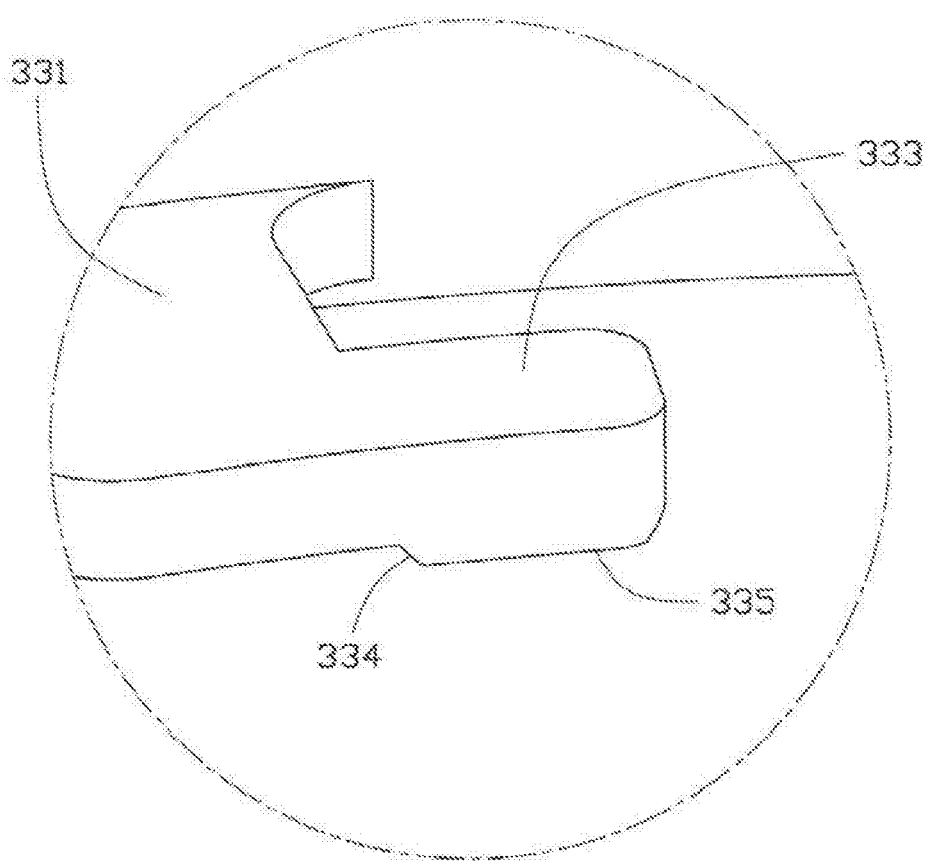
FIG. 8 is an enlarged schematic view of part VIII in FIG. 7.
Figure 10:
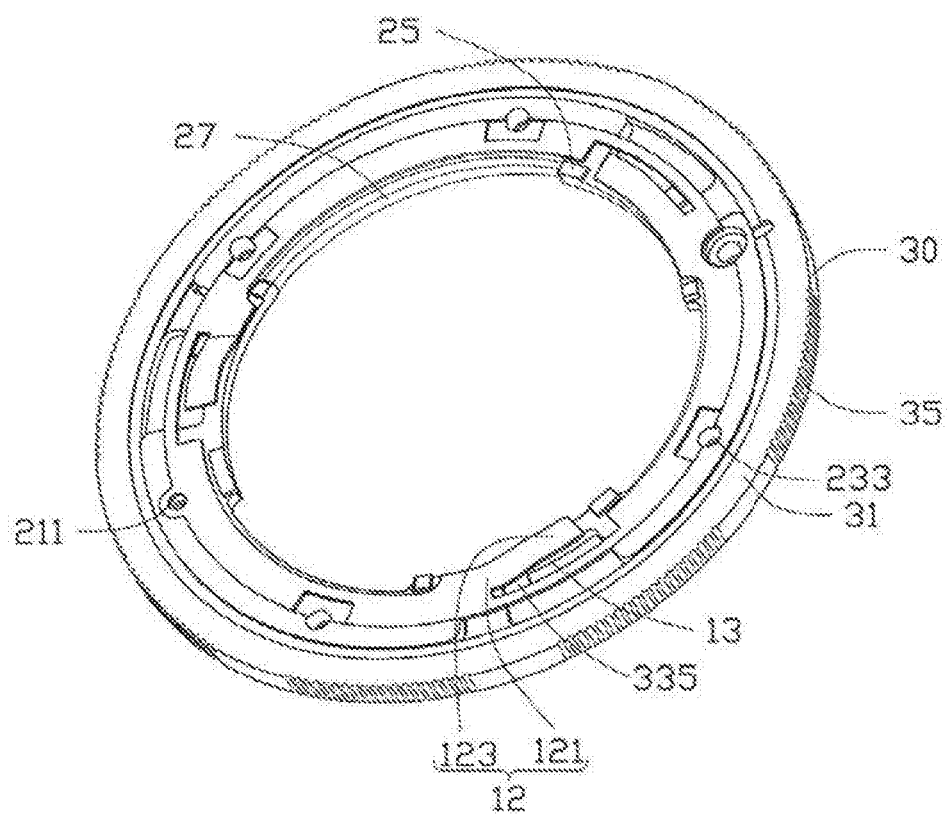
FIG. 10 is an assembled schematic diagram of the lens limiting assembly shown in FIG. 4.

The locking ring 30 comprises a body 31, hooks 33, and anti-slip parts 35. The hooks 33 are arranged at the inner side of the body 31, and the anti-slip parts 35 are arranged at the outer side of the body 31. The body 31 includes a circular ring structure, having a diameter larger than the diameter of the lens assembly ring 20, such that the lens assembly ring 20 can be received in the body 31. The hooks 33 protrude inwardly from the inner side of the body 31. In some embodiments, each of the hooks 33 is approximately L-shaped and comprises a connecting part 331 and a bent part 333, which are integrally arranged. The connecting part 331 is connected to the inner wall of the body 31. One end of the bent part 333 is connected to the connecting part 331, and the other end of the bent part 333 extends straightly. As shown in, e.g., FIG. 7, each of the hooks 33 corresponds to one of the elastic arms 12 of the elastic element 10. A flange 335 is formed on one end of the bent part 333 and extends toward the corresponding elastic arm 12. The flange 335 is configured to abut against the corresponding elastic arm 12. FIG. 8 is an enlarged view of a portion of the hook 33. As shown in FIG. 8, an inclined surface 334 is formed at the side of the flange 335 facing the connecting part 331 to connect the bent part 333 to the flange 335. FIG. 10 shows the lens limiting assembly 100 in an assembled state. Referring to FIGS. 9 and 10 in conjunction, when the elastic element 10 and the lens assembly ring 20 are received in the locking ring 30, the connecting part 331 and the bent part 333 of the hook 33 are received in the corresponding receiving groove 213 of the lens assembly ring 20, and the flange 335 is accommodated in the corresponding gap 13 of the elastic element 10 and abuts against the elastic arm 12. When the flange 335 moves relative to the elastic arm 12 and abuts against the elastic arm 12, the inclined surface 334 contacts the elastic arm 12. Further, the flange 335 moves along with the inclined surface 334 to abut against the elastic arm 12, thereby ensuring a smooth fit between the flange 335 and the elastic arm 12. The anti-slip part 35 may include an anti-slip thread, and is used to avoid slipping when a user rotates the locking ring 30.

Referring again to FIG. 6, when the lens limiting assembly 100 is assembled in the fixing frame 210, the elastic element 10 is nested and snapped on the limiting structure 250 through the snapping opening 16. The lens assembly ring 20 is accommodated on the locking ring 30 and arranged on the elastic element 10. The locating pin 230 passes through the first locating hole 14 of the elastic element 10 and the second locating hole 211 of the lens assembly ring 20 to connect the elastic element 10 and the lens assembly ring 20 in series. The limiting structure 250 passes through the assembly hole 231 of the lens assembly ring 20 and can stretch and retract in a direction in which the limiting structure 250 protrudes, so as to limit the position of the lens 310. The locking ring 30 is rotatably arranged on the outer side of the lens assembly ring 20, and the hooks 33 are received in the receiving grooves 213 and abut against the elastic arms 12 of the elastic element 10.

Figure 11:
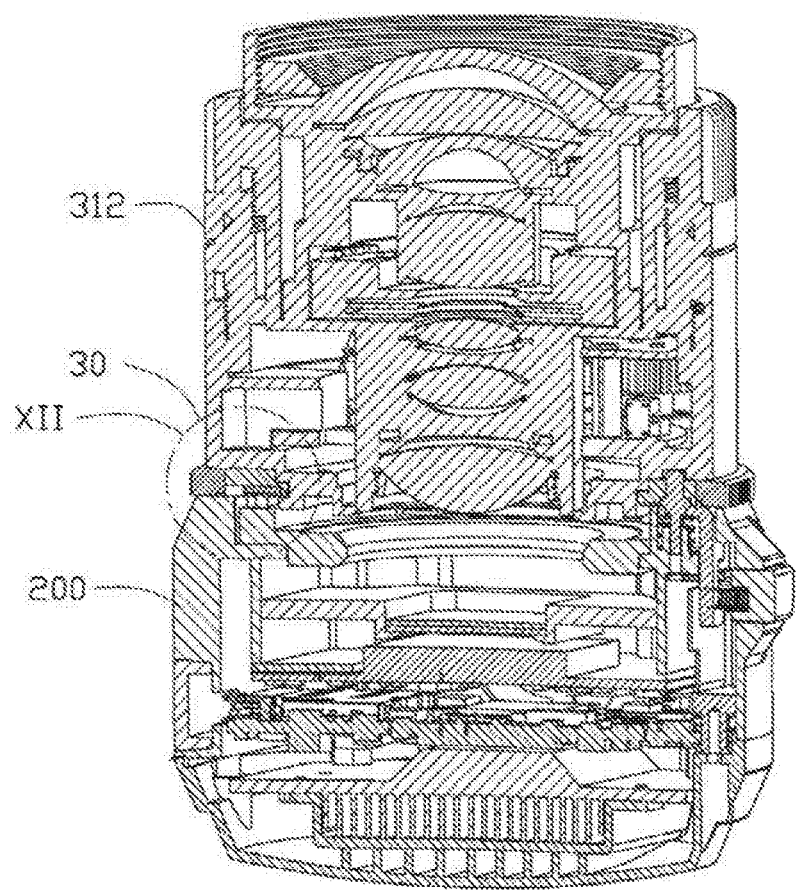
FIG. 11 is a sectional view of the camera shown in FIG. 1 taken along XI-XI line.
Figure 12:
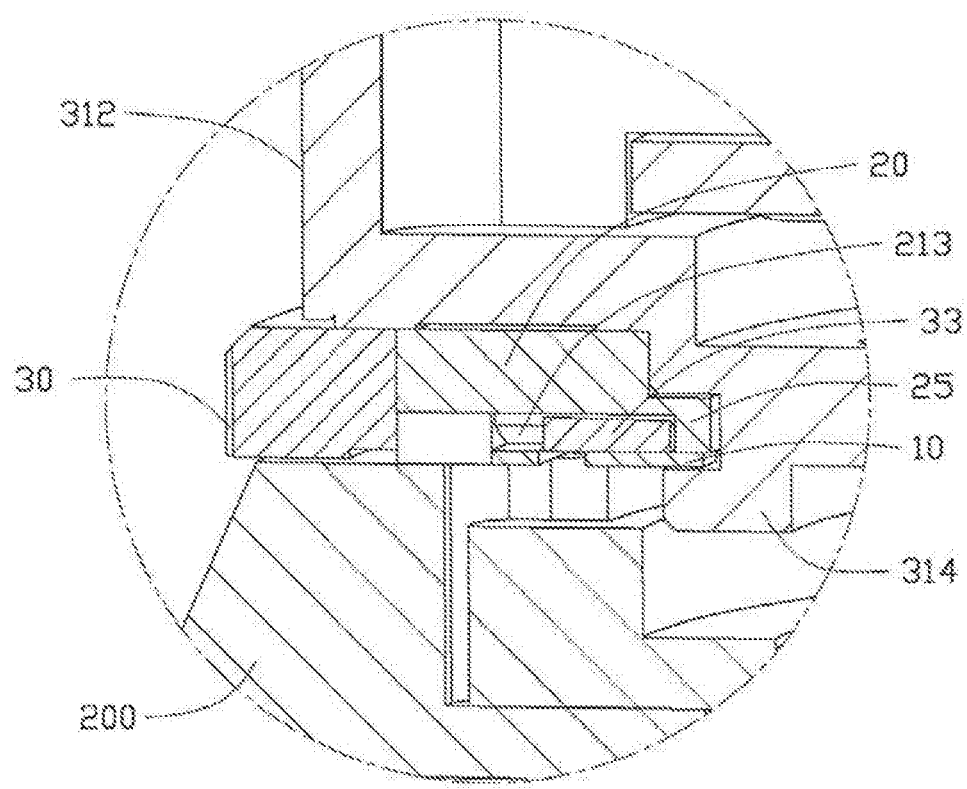
FIG. 12 is an enlarged schematic view of part XII in FIG. 11.

FIG. 11 is a cross-sectional view of the camera 300 in an assembled state. FIG. 12 is an enlarged view showing a portion of the camera 300. As shown in FIGS. 11 and 12, when the lens 310 is assembled into the lens assembly ring 20, each of the snapping bodies 314 slides into the lens assembly ring 20 through the corresponding mounting part 27. Then the lens 310 is rotated such that the snapping body 314 rotates to a position below the corresponding limiting part 25 of the lens assembly ring 20 and the corresponding elastic arm 12 of the elastic member 10. Then the locking ring 30 can be rotated in one direction, such that the flange 335 of each of the hooks 33 slides from the second end 123 of the corresponding elastic arm 12 to the first end 121 of the elastic arm 12. Since the position of the first end 121 of the elastic arm 12 is higher than the position of the second end 123, the flange 335 presses the elastic element 10 while sliding, and the elastic arm 12 in turn presses the corresponding snapping body 314 of the lens 310 such that the lens 310 moves in the direction towards the camera body 200. As such, the lens 310 can be locked to the camera body 200. When the locking ring 30 rotates in the opposite direction, the flange 335 of the hook 33 slides from the first end 121 of the corresponding elastic arm 12 to the second end 123 to in turn release the elastic arm 12, such that the lens 310 is no longer locked to the camera body 200, and then the lens 310 can be removed from the camera body 200.

The shape of the flange 335 of the hook 33 is not limited to that shown in the above figures, as long as the height of the flange 335 is greater than the distance between the first end 121 of the elastic arm 12 and the elastic body 11.

The lens assembly ring 20 does not have to be fixed to the camera body 200 by a bolt hole and a bolt. For example, in some other embodiments, the lens assembly ring 20 can be fixed to the camera body 200 using adhesion.

Figure 13:
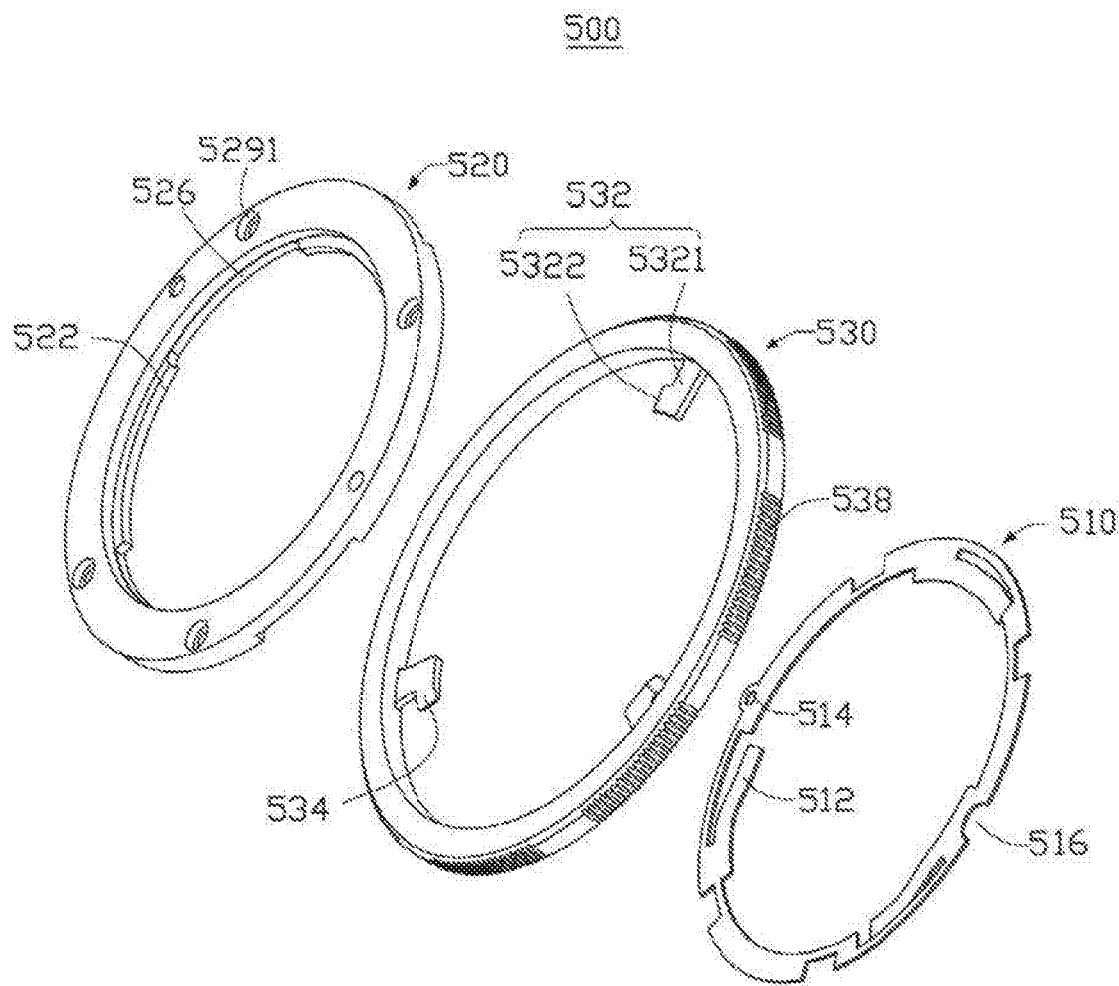
FIG. 13 is an exploded perspective view of a lens limiting assembly according to another exemplary embodiment.
Figure 14:
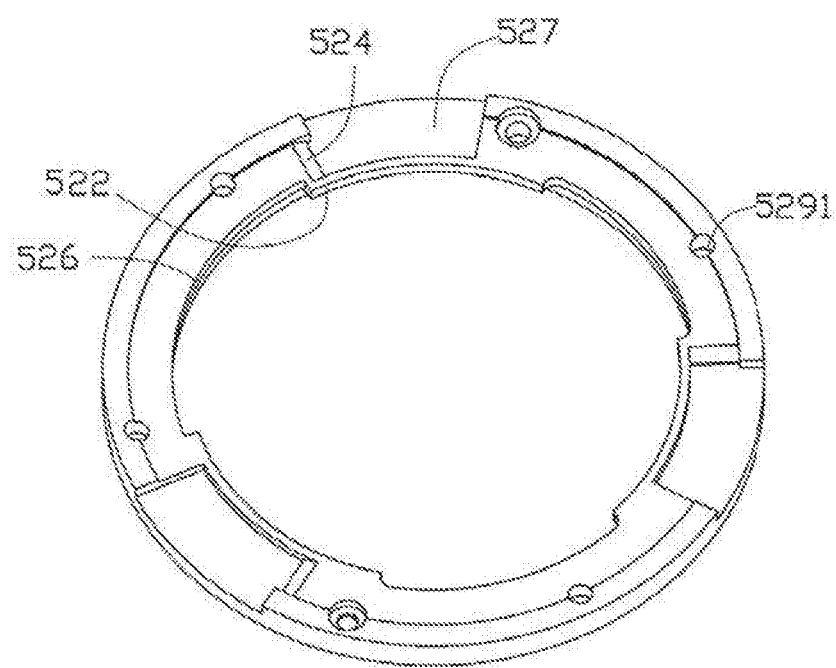
FIG. 14 is a schematic diagram of a rear side of a lens assembly ring shown in FIG. 13.
Figure 15:
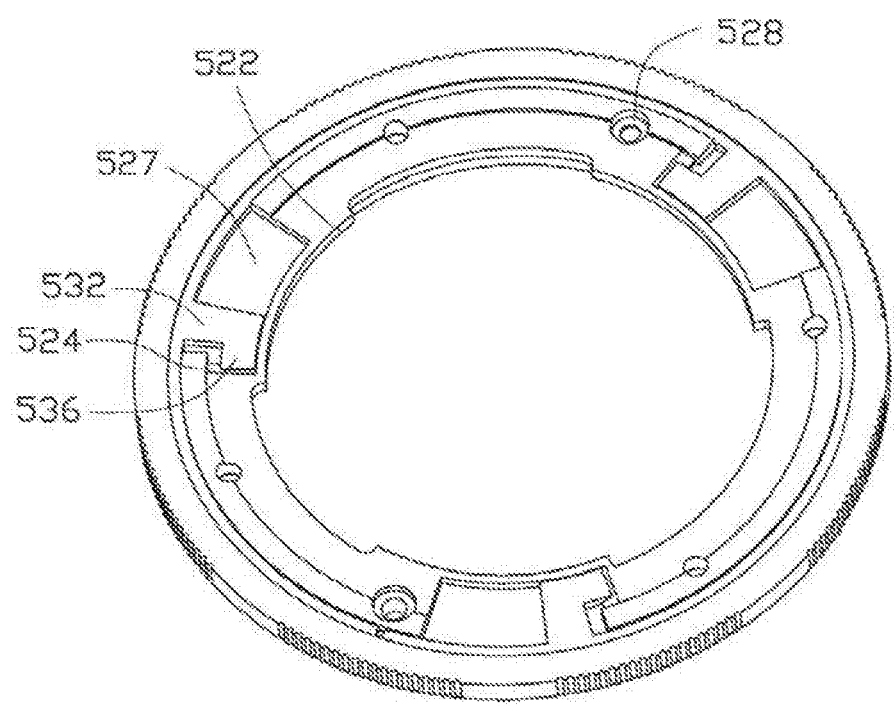
FIG. 15 is an assembled schematic diagram of the lens assembly ring shown in FIG. 14 with a locking ring.

FIGS. 13-15 show another exemplary lens limiting assembly 500 according to some other embodiments of the disclosure. As shown in FIGS. 13-15, the lens limiting assembly 500 comprises an elastic element 510, a lens assembly ring 520, and a locking ring 530. The lens assembly ring 520 is arranged on the elastic element 510, and is accommodated in the locking ring 530. The locking ring 530 is rotatable relative to the lens assembly ring 520.

The elastic element 510 includes an annular strip spring. Three elastic arms 512 spaced apart from each other extend from the inner side of the strip spring. The elastic element 510 is provided with a first locating hole 514 and a snapping opening 516. In some embodiments, as shown in, e.g., FIGS. 13-15, the snapping opening 516 is provided inwardly from the outer wall of the elastic element 510 and has a semicircular shape.

A second locating hole 528 is provided on an end face of the lens assembly ring 520 that faces the elastic element 510. The second locating hole 528 includes a blind hole corresponding to the first locating hole 514 and is connected in series with the first locating hole 514 by a locating pin of the camera body. The lens assembly ring 520 is further provided with a fitting hole 529 (see also FIG. 16), which penetrates through the opposite end faces of the lens assembly ring 520 and fits with other components of the camera body. The lens assembly ring 520 is also provided with four bolt holes 5291 for fixing to the camera body. Three limiting parts 522 spaced apart from each other extend from the inner wall of the lens assembly ring 520. Three receiving grooves 527 spaced apart from each other are provided on an end face of the lens assembly ring 520 facing the elastic element 510. Each receiving groove 527 includes a first fitting face 524 provided at one side of the receiving groove 527. In some embodiments, the bottom face of the receiving groove 527 includes a planar surface. The first fitting face 524 extends outwardly from the bottom face of the receiving groove 527, and is inclined in a circumferential direction of the lens assembly ring 520. The limiting parts 522 include ribs arranged at the inner side of the lens assembly ring 520. The left and right sides of each limiting part 522 include smooth surfaces, and may directly serve as the inner wall face of the lens assembly ring 520 or as a sliding groove face provided inwardly.

The locking ring 530 includes anti-slip grooves 538 provided on the outer side of the locking ring 530, and three hooks 532 spaced apart from each other and provided on the inner side of the locking ring 530. In some embodiments, each hook 532 has an approximately L-shape extending from the inner wall of the locking ring 530. Each hook 532 comprises a connecting part 5321 connected to the inner wall of the locking ring 530 and a bent part 5322 connected to the connecting part 5321. Each bent part 5322 includes a first surface facing the lens assembly ring 520 and a second surface opposite to the first surface. An end portion of the first surface is inclined relative to the rest of the first surface, forming a second fitting face 534. The second surface of the bent part 5322 includes a planar surface 536. The second fitting face 534 has an inclination matching the inclination of the first fitting face 524. Each hook 532 is received in a corresponding receiving groove 527. The second fitting face 534 abuts against the first fitting face 524, and the planar surface 536 is configured to abut against the corresponding elastic arm 512 of the elastic element 510.

When a lens including three snapping bodies spaced apart from each other and provided on an outer side of the lens (see FIG. 17) is to be assembled into the lens assembly ring 520, the snapping bodies slide into the lens assembly ring 520 along a smooth surface 526 of the lens assembly ring 520. Then, the lens can be rotated such that each snapping body may rotate to a position below the corresponding limiting part 522 of the lens assembly ring 520 and the corresponding elastic arm 512 of the elastic element 510. Then the locking ring 530 can be rotated in one direction, such that the second fitting face 534 of each hook 532 moves on the corresponding first fitting face 524 and presses the elastic element 510 while the height of the first fitting face 524 increases. Consequently, the elastic arms 512 of the elastic element 510 press the snapping bodies of the lens in the direction towards the camera body, i.e., to lock the lens. When the locking ring 530 is rotated in an opposite direction, the second fitting face 534 of each hook 532 moves on the corresponding first fitting face 524 in an opposite direction, and the elastic element 510 is released while the height of the first fitting face 524 decreases, such that the lens can rotate out.

Figure 16:
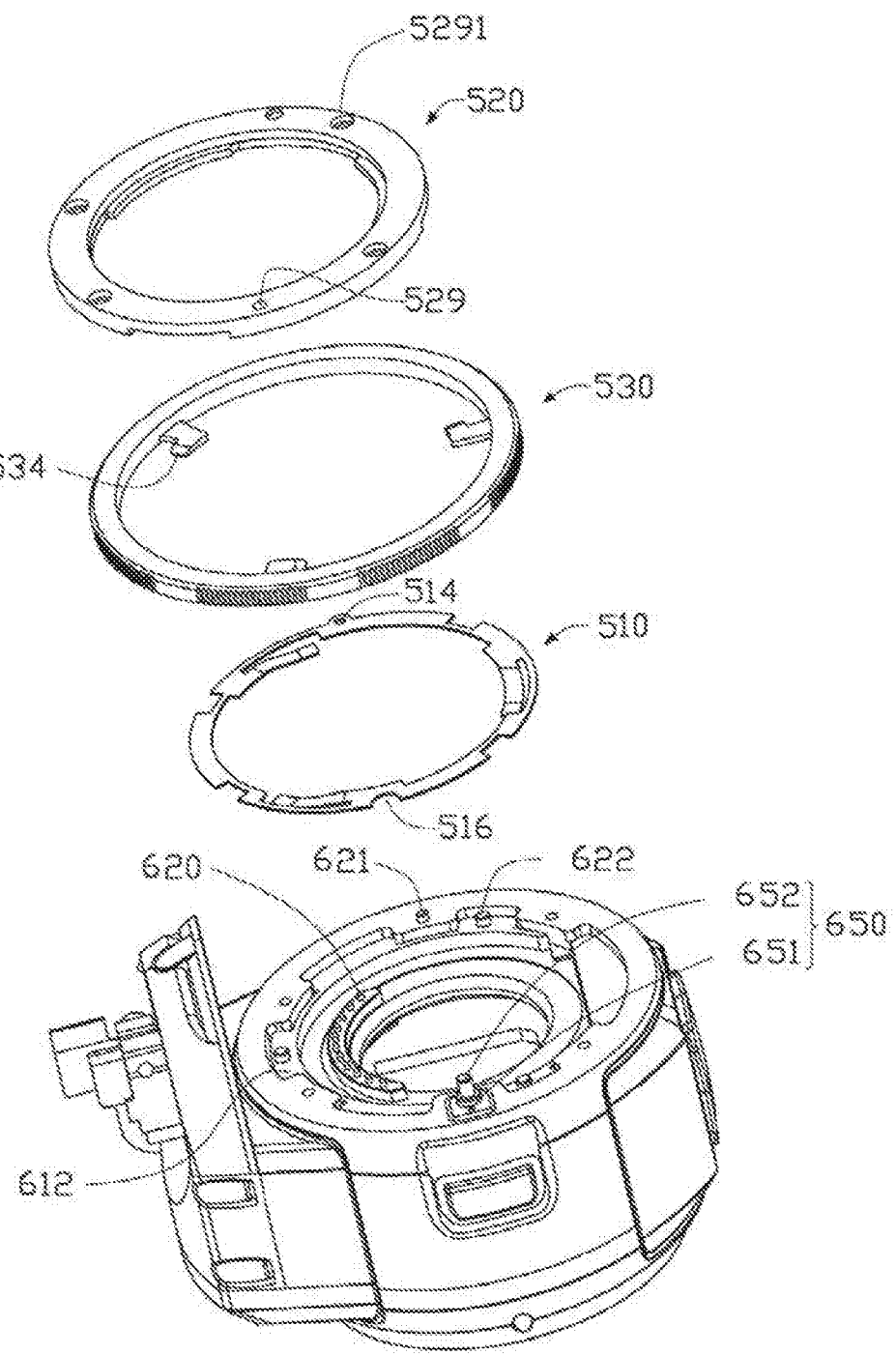
FIG. 16 is a partially exploded perspective schematic diagram of a camera body according to another exemplary embodiment.
Figure 17:
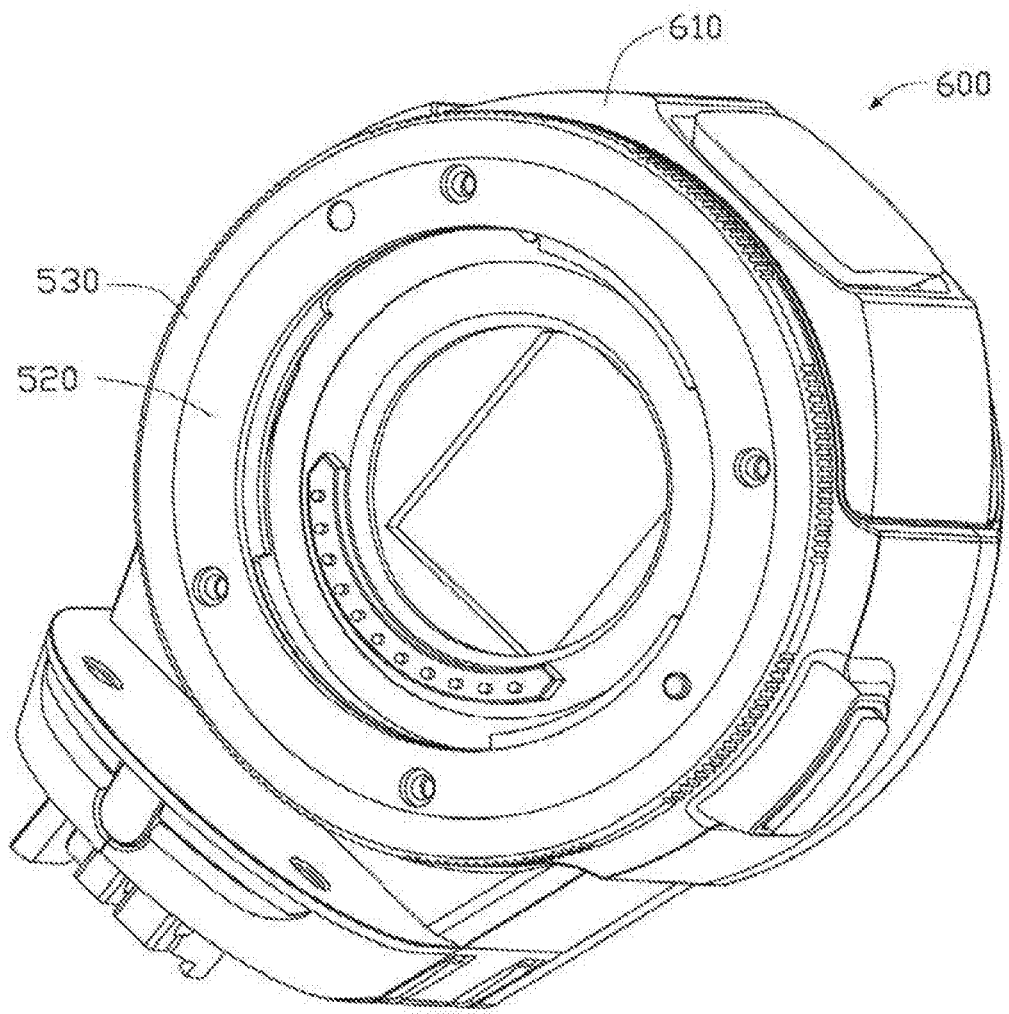
FIG. 17 is an assembly schematic diagram of the camera body shown in FIG. 16.

FIGS. 16 and 17 show another exemplary camera body 600 according to some other embodiments of the disclosure. As shown in FIGS. 16 and 17, the camera body 600 comprises a fixing frame 610 having a contact base mounting position 612 for assembling a lens having snapping bodies provided at the outer side of the lens. The lens limiting assembly 500 can be mounted at the contact base mounting position 612. The fixing frame 610 further comprises a locating pin 621 and four bolts 622 protruding from the fixing frame 610, and is provided with a telescopic limiting structure 650. The elastic element 510 can be nested and snapped with a circular nut 651 of the telescopic limiting structure 650 through the snapping opening 516. The lens assembly ring 520 is fitted with the locking ring 530 and arranged on the elastic element 510. The locating pin 621 passes through the first locating hole 514 of the elastic element 510 and passes into the second locating hole 528 of the lens assembly ring 520 to connect the elastic element 510 and the lens assembly ring 520 in series. The four bolts 622 pass into four bolt holes 5291 of the lens assembly ring 520 to fix the lens assembly ring 520. A post 652 of the telescopic limiting structure 650 protrudes out of the fitting hole 529 of the lens assembly ring 520, and can stretch and retract in a direction in which the post 652 protrudes and can limit the position of the lens. The locking ring 530 is rotatably arranged at a periphery of the lens assembly ring 520.

Figure 18:
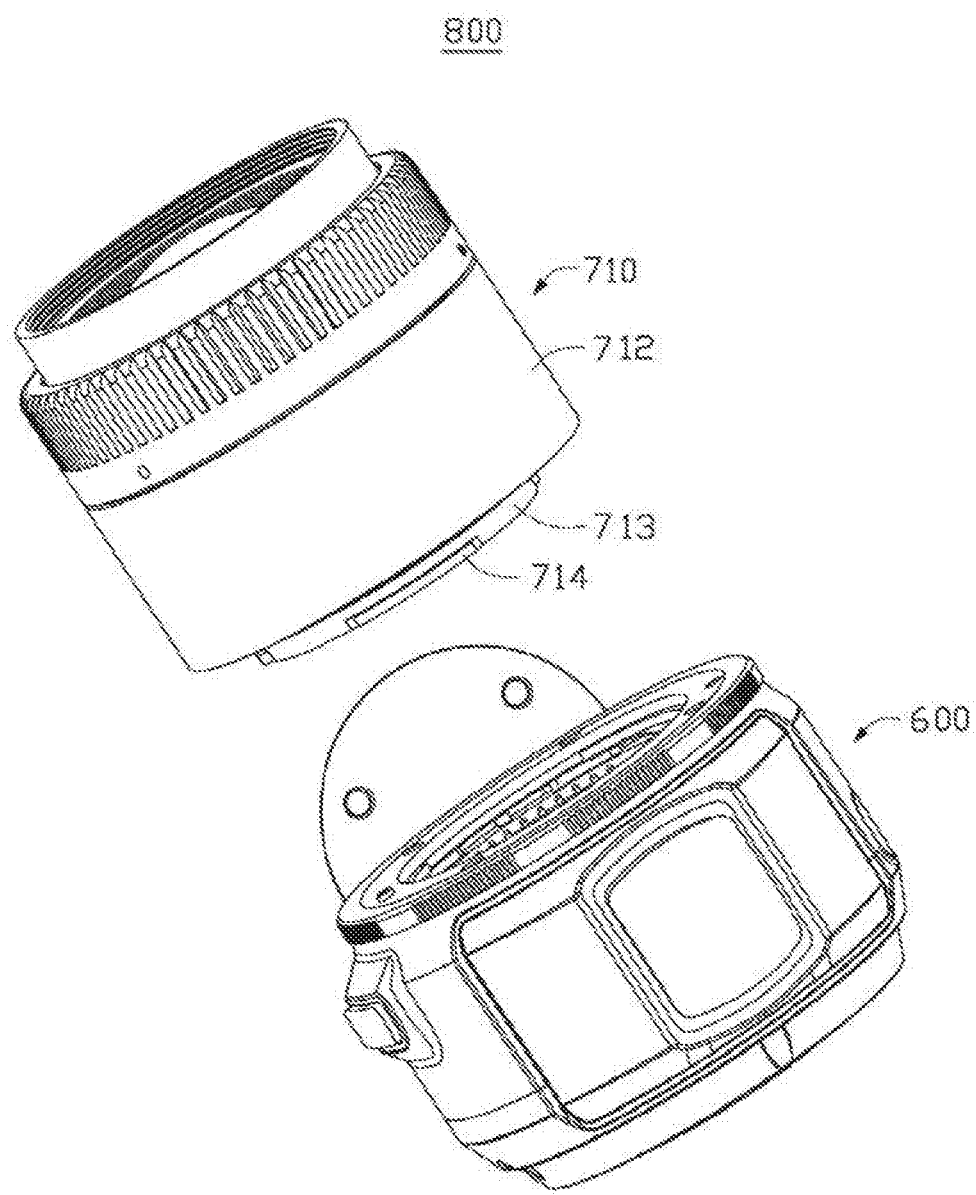
FIG. 18 is a perspective schematic diagram of a camera according to another exemplary embodiment, before a lens being assembled with the camera body.
Figure 19:
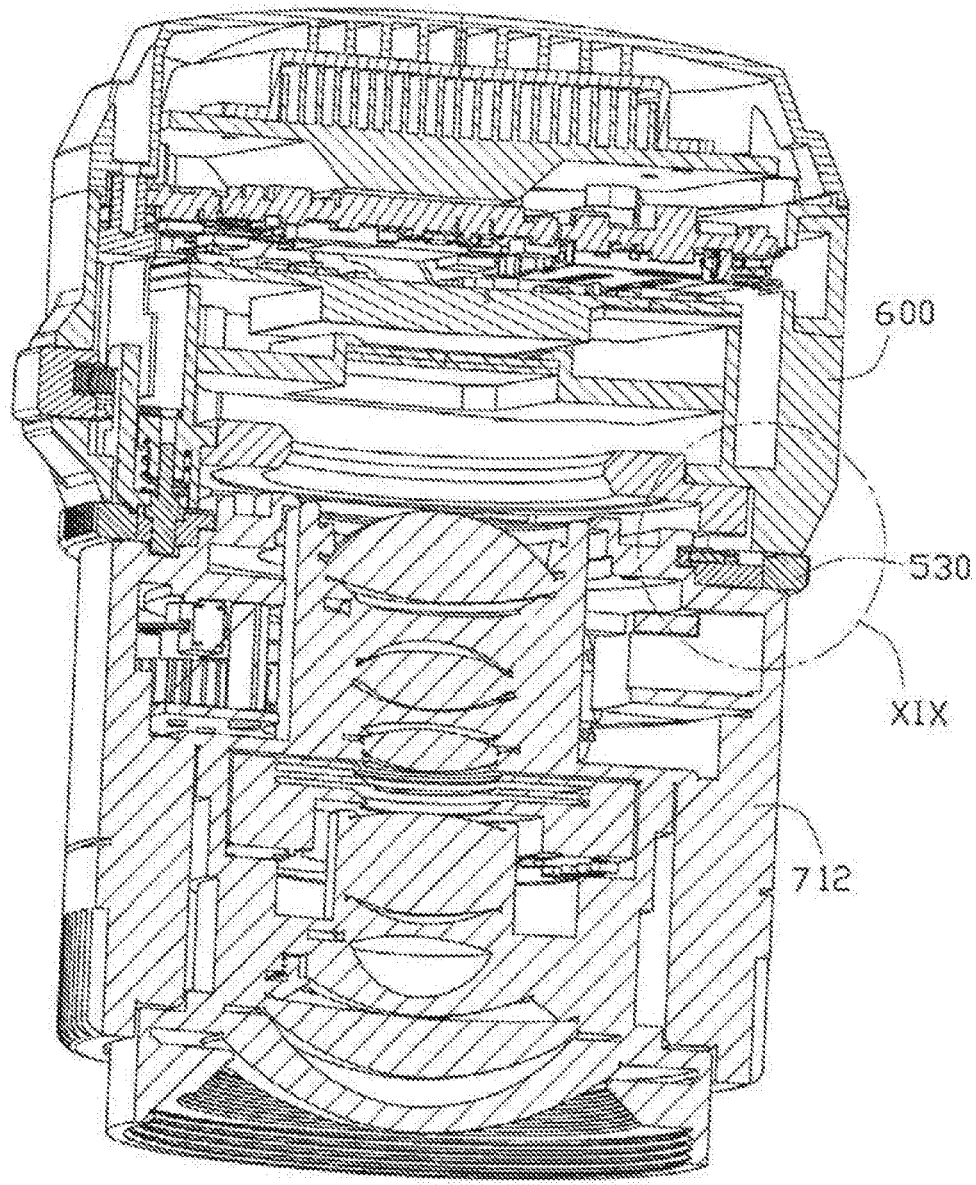
FIG. 19 is a sectional view of the camera shown in FIG. 18 after the lens being assembled with the camera body.
Figure 20:
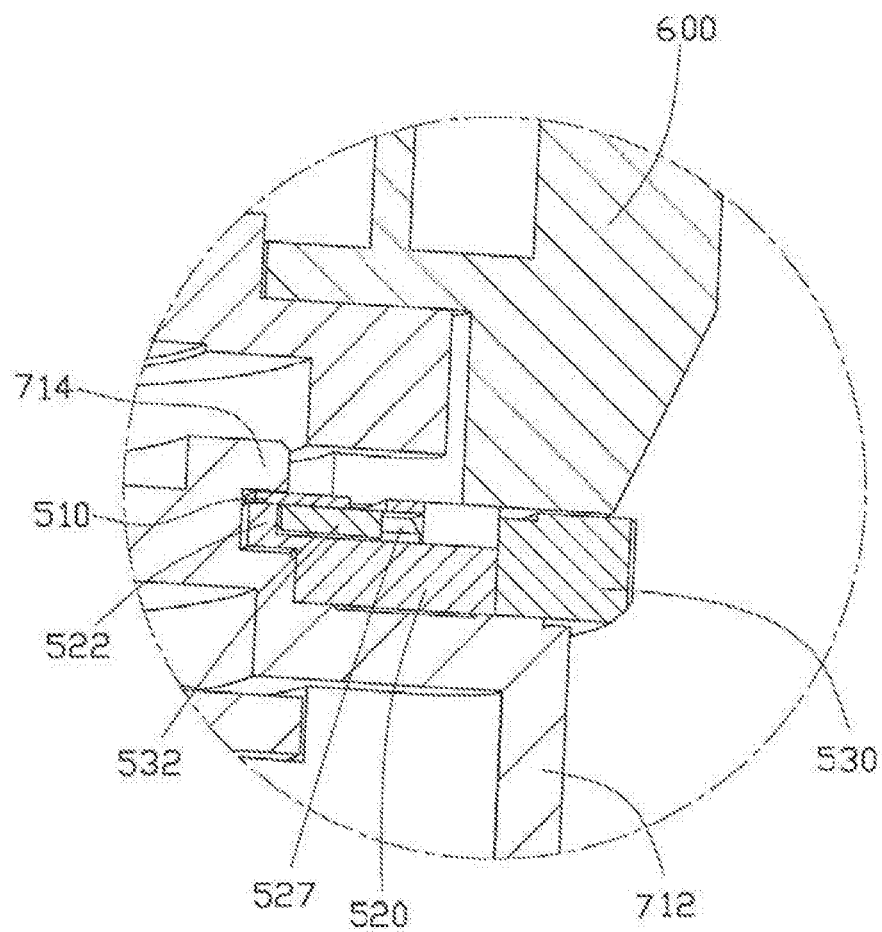
FIG. 20 is an enlarged view of part XIX in FIG. 19.

FIGS. 18-20 show another exemplary camera 800 according to some other embodiments of the disclosure. As shown in FIGS. 18-20, the camera 800 comprises a lens 700 and the camera body 600. The lens 700 comprises a lens barrel 712 comprising an assembly part 713. Three snapping bodies 714 spaced apart from each other are provided on an outer wall of the assembly part 713. In some embodiments, each of the snapping bodies 714 includes a flange. When the lens 700 is to be assembled into the lens assembly ring 520 of the lens limiting assembly 500, the snapping bodies 714 slide along the smooth surface 526 of the lens assembly ring 520 into the lens assembly ring 520. Then, the lens 700 can be rotated such that each of the snapping bodies 714 rotates to a position below the corresponding elastic arm 512 of the elastic element 510. Then the locking ring 530 can be rotated in one direction, such that the second fitting face 534 of each of the hooks 532 moves on the corresponding first fitting face 524 and presses the elastic element 510 in the direction perpendicular to a bottom face of the receiving groove 527 while the height of the first fitting face 524 increases. Consequently, the elastic arms 512 of the elastic element 510 press the snapping bodies 714 of the lens 700 in the direction towards the camera body 600, i.e., to lock the lens 700 to the camera body 600. When the locking ring 530 is rotated in an opposite direction, the second fitting face 534 of each hook 532 moves on the corresponding first fitting face 524 in an opposite direction, and the elastic element 510 is released while the height of the first fitting face 524 decreases, such that the lens 700 can rotate out of the camera body 600.

Contacts 620 are arranged in the camera body 600 and are configured to be electrically coupled to, e.g., a driver in the lens 700 when the lens 700 is fastened and assembled on the camera body 600.

The number of the elastic arms 512, the number of the receiving grooves 527, the number of the limiting parts 522, the number of the hooks 532, and the number of the snapping bodies 714 are not limited to the above-described numbers, and can be chosen according to actual needs.

Further, the shape of the hook 532 is not necessarily as shown in the above figures, as long as the hook 532 can smoothly slide between the first fitting face 524 and the elastic element 510.

The lens assembly ring 520 does not have to be fixed to the camera body 600 by a bolt hole and a bolt. For example, in some other embodiments, the lens assembly ring 520 can be fixed to the camera body 600 using adhesion.

In summary, consistent with embodiments of the disclosure, the lens limiting assembly comprises a locking ring. When the locking ring is screwed on, the elastic element is pressed to tightly press the snapping bodies of the lens, so as to lock the lens to prevent the lens from rotating and falling off in an axial direction. For the camera body and camera provided in the embodiments of the present disclosure, because of the limiting assembly, the lens and the camera body can be locked to prevent the lens from rotating and falling off in an axial direction.

The above is merely some embodiments of the present disclosure and is not intended to limit the scope of the present disclosure. Any transformation for equivalent structures or equivalent procedures made using the contents of the description and the accompanying drawings of the present disclosure or applied in other relevant technical fields directly or indirectly should likewise be similarly encompassed in the scope of the present disclosure.

What is claimed is:

1. A lens limiting assembly comprising:
    an elastic element including an annular elastic body and an elastic arm extending from an inner side of the elastic body inward and downward along an axial direction; and
    a locking ring including a flange configured to abut against the elastic arm.

2. The lens limiting assembly of claim 1, wherein the elastic arm includes a first end connected to the elastic body and a second end extending away from the elastic body, the second end being spaced apart from the elastic body along the axial direction.

3. The lens limiting assembly of claim 2, wherein the flange is configured to be accommodated in a gap formed between the elastic arm and the elastic body.

4. The lens limiting assembly of claim 1, further comprising:
    a lens assembly ring arranged on the elastic element.

5. The lens limiting assembly of claim 4, wherein the locking ring is arranged outside the lens assembly ring.

6. The lens limiting assembly of claim 4, wherein the flange is configured to press the elastic arm when the locking ring rotates in one direction.

7. The lens limiting assembly of claim 4, wherein the flange is configured to be positioned between the lens assembly ring and the elastic arm.

8. The lens limiting assembly of claim 4, wherein the lens assembly ring includes a limiting part, such that when a lens is rotatably assembled into the lens assembly ring, a snapping body of the lens is held below the limiting part and the elastic element.

9. The lens limiting assembly of claim 4, wherein:
    the lens assembly ring includes a receiving groove; and
    the locking ring includes:
        a body; and
        a hook protruding inwardly from the body and accommodated in the receiving groove, the hook including:
            a connecting part connected to an inner wall of the body; and
            a bent part, one end of the bent part being connected to the connecting part, another end of the bent part extending straightly, and the flange being formed at a tail end of the bent part and extending toward the elastic arm.

10. A camera body comprising:
    a fixing frame having a contact base mounting position; and
    a lens limiting assembly mounted on the contact base mounting position and including:
        an elastic element including an annular elastic body and an elastic arm extending from an inner side of the elastic body inward and downward along an axial direction; and
        a locking ring including a flange configured to abut against the elastic arm.

11. The camera body of claim 10, wherein the lens limiting assembly further includes a lens assembly ring arranged on the elastic element.

12. A camera comprising:
    a lens;
    a camera body configured to receive the lens; and
    a lens limiting assembly arranged on the camera body and including:
        an elastic element including an annular elastic body and an elastic arm extending from an inner side of the elastic body inward and downward along an axial direction; and
        a locking ring including a flange configured to abut against the elastic arm.

13. The camera of claim 12, wherein the elastic arm includes a first end connected to the elastic body and a second end extending away from the elastic body, the second end being spaced apart from the elastic body along the axial direction.

14. The camera of claim 13, wherein the flange is configured to be accommodated in a gap formed between the elastic arm and the elastic body.

15. The camera of claim 12, wherein the lens limiting assembly further includes a lens assembly ring arranged on the elastic element.

16. The camera of claim 15, wherein the locking ring is arranged outside the lens assembly ring.

17. The camera of claim 15, wherein the flange is configured to press the elastic arm when the locking ring rotates in one direction.

18. The camera of claim 15, wherein the flange is configured to be positioned between the lens assembly ring and the elastic arm.

19. The camera of claim 15, wherein:
the lens includes a snapping body provided on an outer side of the lens; and
the lens assembly ring includes a limiting part, such that when the lens is rotatably assembled into the lens assembly ring, the snapping body of the lens is held below the limiting part and the elastic element.

20. The camera of claim 15, wherein:
the lens assembly ring includes a receiving groove; and
the locking ring includes:
a body; and
a hook protruding inwardly from the body and accommodated in the receiving groove, the hook including:
a connecting part connected to an inner wall of the body; and
a bent part, one end of the bent part being connected to the connecting part, another end of the bent part extending straightly, and the flange being formed at a tail end of the bent part and extending toward the elastic arm.

* * * * *